Sept. 29, 1925.

O. WECHSBERG 1,555,726

PACKING DEVICE FOR ROTATING SHAFTS

Filed Aug. 29, 1921

Inventor:
Otto Wechsberg
By Geo. H. Kennedy
Attorney

Patented Sept. 29, 1925.

1,555,726

UNITED STATES PATENT OFFICE.

OTTO WECHSBERG, OF WORCESTER, MASSACHUSETTS, ASSIGNOR, BY MESNE ASSIGN-MENTS, TO COPPUS ENGINEERING AND EQUIPMENT CORPORATION, OF WORCESTER, MASSACHUSETTS, A CORPORATION OF MASSACHUSETTS.

PACKING DEVICE FOR ROTATING SHAFTS.

Application filed August 29, 1921. Serial No. 496,271.

*To all whom it may concern:*

Be it known that I, OTTO WECHSBERG, a citizen of the United States, residing at Worcester, in the county of Worcester and Commonwealth of Massachusetts, have invented a new and useful Improvement in a Packing Device for Rotating Shafts, of which the following, together with the accompanying drawings, is a specification.

My invention relates to packing devices for rotating shafts and has for its object to provide an improved packing device that is adapted to effectively prevent the passage of water, steam or a gaseous medium along a rotating shaft at the point where it passes through a wall, the opposite sides of which are at different pressures.

In the accompanying drawings.

Like reference characters refer to like parts in the different figures.

Figure 1:
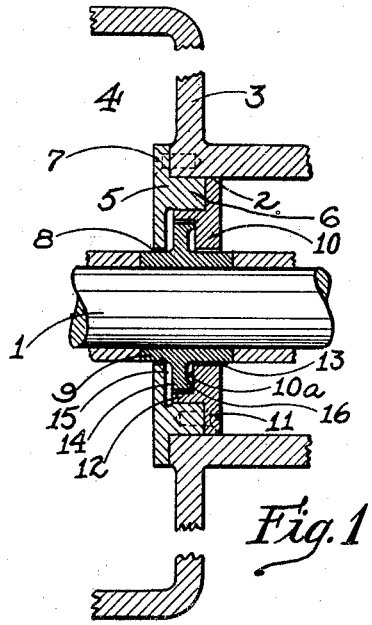
Fig. 1 is a transverse sectional view showing a portion of a shaft provided with a packing device constructed in accordance with my invention.

Referring to Fig. 1 of the drawings, a rotatably mounted shaft 1, only a portion of which is shown, passes through an opening 2 provided in a wall 3. The wall 3 forms one side of a chamber generally indicated at 4, the pressure of which is above that an the other side of the wall 3. For instance, the wall 3 may constitute one side of the exhaust chamber 4 of a turbine containing steam or a gaseous medium, the pressure of which is above that of the medium on the other side of the wall 3.

An annular plate 5 is provided with a shoulder 6 fitting closely in the opening 2 in the wall 3, and is secured to the wall 3 by any suitable means, such as a screw 7. The plate 5 is further provided with a central opening 8 of slightly greater diameter than a collar 9 mounted on the shaft 1 and adapted to rotate therewith. A second annular plate 10 is secured to the shoulder 6 of the plate 5 by any suitable means, such as a screw 11, and is provided with an annular flange 12 fitting closely within the shoulder 6. The plate 10 is further provided with a central opening 13 of slightly greater diameter than the collar 9 on the shaft 1.

The collar 9 is provided with an annular web 14, which is located in the space 15 between the plates 5 and 10 and is formed with an overhanging rim 16 extending in the direction of the end thrust of the shaft 1 and just touching the inner face $10^a$ of the plate 10. When the shaft 1 is rotating the end thrust tends to move it longitudinally toward the wall 3, so that the rim 16 is continuously in contact with the face $10^a$ around a narrow annular path located in a plane substantially at right angles to the axis of said shaft, and exhaust steam entering the left hand portion of the space 15 from the chamber 4 is prevented from passing between the rim 16 and the face $10^a$ to the right hand portion of space 15 and from thence out into the atmosphere. In this way a substantially leak-proof packing is provided for the shaft 1 at the point where it passes through the wall 3.

Figure 2:
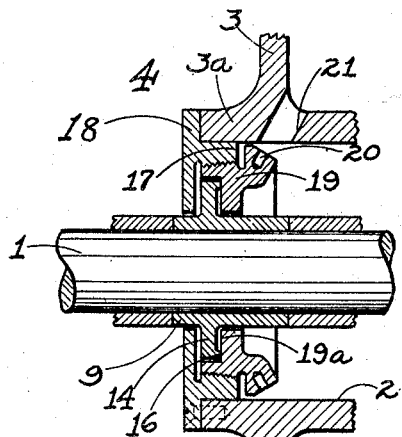
Figs. 2, 3 and 4 are views similar to Fig. 1, showing modifications of my device to meet different operating conditions.

A modification of my invention is shown in Fig. 2, in which a flange $3^a$ surrounds the opening 2 in the wall 3 for receiving the shoulder 17 of a plate 18. The shoulder 17 of the plate 18 is internally threaded to receive an externally threaded plug 19, the outer end of which is provided with holes 20 for the insertion of a pin or other suitable tool, by means of which the plug 19 may be turned in the plate 18. The wall 3 is provided with an opening 21 through which the tool may be inserted into the holes 20.

The collar 9 on the shaft 1 is provided with a web 14 having a rim 16, just as shown in Fig. 1, the same extending in the direction of the inner face $19^a$ of the plug 19 which latter member may be turned into the shoulder 17 until the face $19^a$ is just in contact with the rim 16. Obviously, with this construction, it is not necessary to finish the edge of the rim 16 with the same accuracy as would be necessary with the construction shown in Fig. 1, for the reason that the plug 19 may be adjusted to obtain the desired closeness of fit between the rim 16 and the face $19^a$ after the parts of the device have been assembled. The provision of the adjustable plug 19 also makes it possible to compensate for wear between the rim 16 and the face $19^a$ which would otherwise permit the leakage of steam from the chamber 4.

The threads on the plug 19 are cut so that if the shaft 1 should tend to bind or "freeze" because of too close contact between the rim 16 and the face 19a, the rotation of the shaft 1 will tend to unscrew the plug 19 and thereby automatically free the shaft. In other words, assuming that the shaft 1 is rotating in a clockwise direction, as viewed from the right, the threads on the plug 19 would be left-handed, so that any tendency for the plug 19 to rotate with the shaft 1 would immediately cause the plug 19 to be unscrewed. The plug 19 is also shown as being tapered, so as to insure that the threads will be leak-proof and also to insure that the plug 19 will remain in position after being adjusted, unless binding of the parts causes the plug to be unscrewed, as described above.

Figure 3:
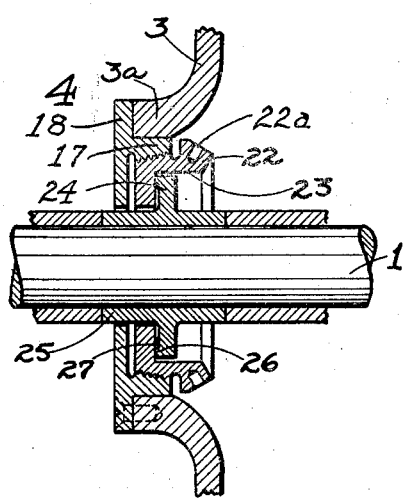

Referring to Fig. 3, a plug 22 is externally threaded to be received in the plate 18, which is constructed as shown in Fig. 2, and is provided with a central opening 23 within which is located an annular web 24 formed on a collar 25. The web 24 is provided with an overhanging rim 26 which faces toward the bottom surface 27 of the opening 23 in the plug 22. The plug 22 is adapted to be turned in the plate 18 until the rim 26 engages the surface 27 closely enough to prevent the passage of steam or gaseous medium from the chamber 4, as before. In this modification, the wall 3 does not cover the end of the plug 22, so that the tool receiving holes 22a are readily accessible for the insertion of a tool therein. The construction shown in Fig. 3 is adapted to be used when the shaft 1 has a tendency for axial movement, or thrust, in a direction opposite to the direction in which the shaft tends to move in Fig. 2; consequently the rim 26 faces in the opposite direction to the rim 16.

Figure 4:
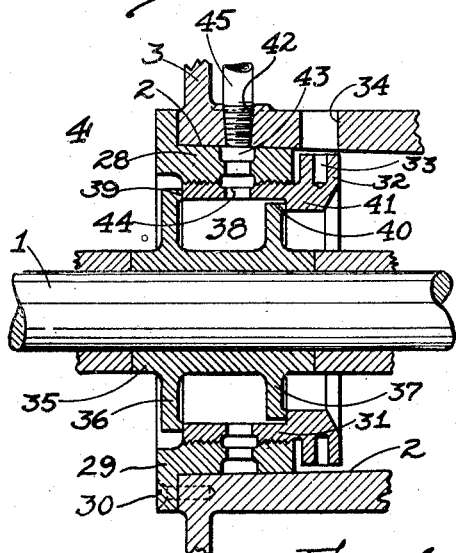

Referring to Fig. 4, there is shown a further modification of my packing device which is to be used where the pressure on one side of the wall 3 is below that of the atmosphere, as for instance, when the exhaust chamber 4 is connected to a condenser. It is obvious that with this arrangement extra precautions must be taken to prevent the admission of air to the chamber 4 where it would destroy the vacuum. In this construction, the wall 3 is provided with an opening 2, as before within which is received a bushing 28 provided with a flange 29 that is secured to the wall 3 by any suitable means, such as a screw 30. The bushing 28 is internally threaded to receive an externally threaded hollow plug 31, the head 32 of which is provided with radial holes 33 for the reception of a suitable tool, which may be inserted through an opening 34 provided in the wall 3. A collar 35, adapted to turn with the shaft 1, is provided with annular webs 36 and 37, which extend into the central opening 38 in the plug 31. The web 36 is provided with a rim 39 which extends in the direction of the end of the plug 31, and the web 37 is provided with a rim 40 which extends in the direction of a shoulder 41 formed on the plug 31. The plug 31 may be turned in the bushing 28 until its end and the shoulder 41 engage the rims 39 and 40, respectively.

The wall 3 is provided with an opening 42 which communicates with openings 43 and 44 provided in the walls of the bushing 28 and of the plug 31, respectively. The opening 42 is adapted to receive a pipe 45 which may be connected to a suitable source of low pressure steam. In this way, low pressure steam is admitted to the space 38 between the webs 36 and 37 when the shaft 1 is rotating, and the chamber 4 is at a pressure below that of the atmosphere. The presence of low pressure steam in the space 38 effectively prevents the passage of air along the shaft into the chamber 4, for the reason that any possible leakage that might occur past the rim 40 will be from the space 38 outwardly into the atmosphere. Should any of the low pressure steam leak past the rim 39 into the chamber 4, it will not in any way affect the vacuum.

In the disclosure of Fig. 4 the thrust of shaft 1 is assumed to be to the right as in the construction shown in Fig. 1. At the same time the pressure in chamber 4 is assumed to be less than the pressure on the other side of the wall 3. It will be understood that in the steam turbine art such a condition can readily exist, as the kinetic energy of the steam impinging on the blades has often far more thrust producing effect on the shaft than the relatively slight difference of pressure existing on the two sides of the packing. It will also be understood that my invention relates to a packing, and the different modifications herein described would not necessarily all be adapted to the same turbine.

From the foregoing it is apparent that by my invention I have provided an extremely effective packing device for rotating shafts, by the use of which leakage of water, steam or a gaseous medium may be prevented where the shaft passes through a wall opposite sides of which are at different pressures. My invention is characterized by the fact that the seal between the relatively rotatable packing members is accomplished without the use of springs and without any yielding or floating action on the part of either member. The annular zone of contact between the overhanging rim of the collar carried by the shaft, and the opposed face of the plate surrounding the collar, is maintained entirely by the end thrust of the shaft as it rotates, so that the direction of the end thrust determines the direction in which the rim of the collar faces, as shown in Figs. 1 and 3. While I have shown several forms of my invention in order to clearly illustrate its use to meet different conditions of operation, it is not so limited, but is susceptible of various other modifications and I desire that only such limitations be imposed on the invention as may come within the scope of the appended claims.

I claim:

1. In a differential pressure packing for rotating shafts, a pair of radial webs tightly secured to a shaft, a thrust transmitting facing on the same side of each web, a non-rotatable sleeve tightly secured to a wall, said sleeve being internally threaded, a second sleeve with external threads adapted to screw into the first sleeve, a pair of thrust receiving surfaces on said second sleeve adapted to cooperate with the facings on said webs, and means for introducing steam or other fluid between said webs and said second sleeve.

2. In a differential pressure packing for rotating shafts, a pair of radial webs tightly secured to a shaft, a thrust transmitting facing on the same side of each web, a non-rotatable sleeve tightly secured to a wall, said sleeve being internally threaded, a second sleeve with external threads adapted to screw into the first sleeve, a pair of thrust receiving surfaces on said second sleeve adapted to cooperate with the facings on said webs, and means for introducing steam or other fluid between said webs and said second sleeve, said means including alined holes in the first and second sleeves.

3. In a differential pressure packing for rotating shafts, a pair of radial webs tightly secured to a shaft, a thrust transmitting facing on the same side of each web, a non-rotatable sleeve tightly secured to a wall, said sleeve being internally threaded, a second sleeve with external threads adapted to screw into the first sleeve, an extension to said second sleeve lying beyond said first sleeve, said extension providing holes for the insertion of a tool, a pair of thrust receiving surfaces on said second sleeve adapted to cooperate with the facings on said webs, and means for introducing steam or other fluid between said webs and said second sleeve.

4. In a differential pressure packing for rotating shafts, a pair of radial webs tightly secured to a shaft, a thrust transmitting facing on the same side of each web, a non-rotatable sleeve tightly secured to a wall, said sleeve being internally threaded, a second sleeve with external threads adapted to screw into the first sleeve, an extension to said second sleeve lying beyond said first sleeve, said extension providing holes for the insertion of a tool, a pair of thrust receiving surfaces on said second sleeve adapted to cooperate with the facings on said webs, and means for introducing steam or other fluid between said webs and said second sleeve, said means including alined holes in the first and second sleeves.

Dated this 19th day of August, 1921.

OTTO WECHSBERG.